Figure 1:
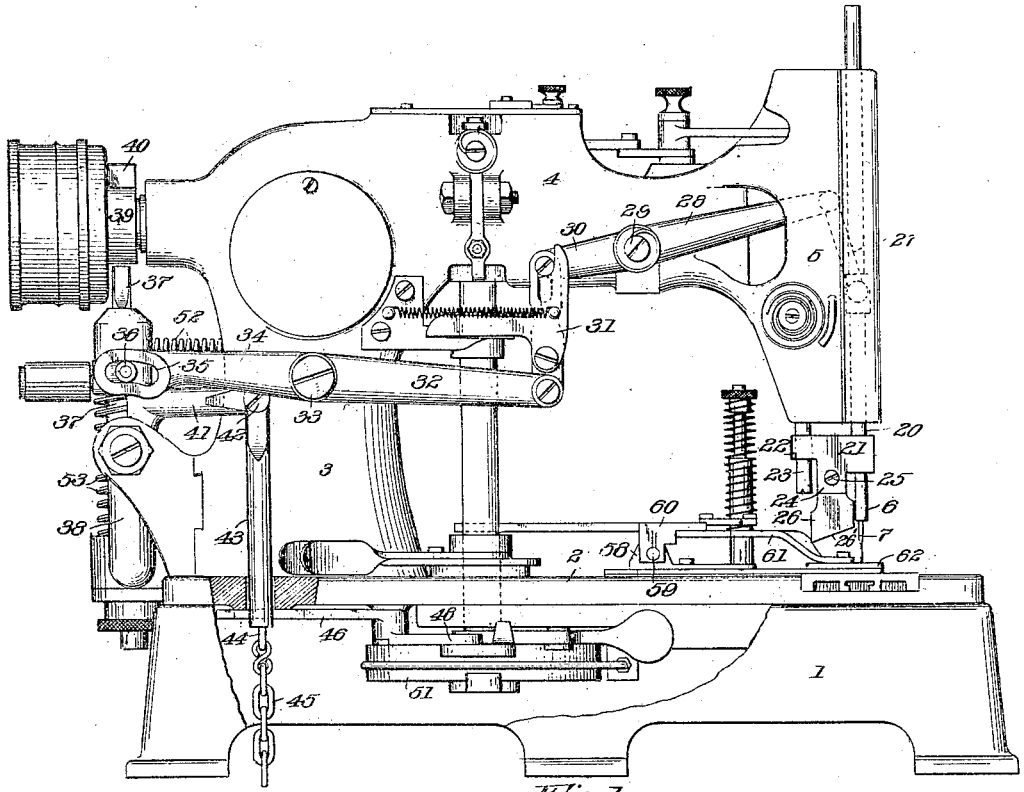

E. B. ALLEN.
BUTTONHOLE CUTTING DEVICE.
APPLICATION FILED MAY 4, 1912.

1,083,236.

Patented Dec. 30, 1913.

2 SHEETS—SHEET 1.

WITNESSES:
L. E. Fischer.
Géza Terna.

INVENTOR
Edward B. Allen
BY
Henry J. Miller
ATTORNEY

E. B. ALLEN.
BUTTONHOLE CUTTING DEVICE.
APPLICATION FILED MAY 4, 1912.

1,083,236.

Patented Dec. 30, 1913.

2 SHEETS—SHEET 2.

WITNESSES:

INVENTOR
Edward B. Allen
BY
Henry J. Miller
ATTORNEY

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

BUTTONHOLE-CUTTING DEVICE.

1,083,236.  Specification of Letters Patent.  Patented Dec. 30, 1913.

Application filed May 4, 1912. Serial No. 695,231.

*To all whom it may concern:*

Be it known that I, EDWARD B. ALLEN, a citizen of the United States, residing at Bridgeport, in the county of Fairfield and State of Connecticut, have invented certain new and useful Improvements in Buttonhole-Cutting Devices, of which the following is a specification, reference being had therein to the accompanying drawings.

This invention has for its primary object the provision of means for producing a stitched "gap-buttonhole," and more particularly in "white work," such as collars and cuffs, in which the material has not the requisite body and texture to receive the covering overseam stitches of uniform length and spacing apart subsequently to the cutting of the slit or aperture therein, and hence requiring in most cases the application of the stitching prior to the cutting of the material between the marginal lines of overseam stitches. Heretofore, in cutting a closed slit in the material in this class of work, it has been customary to employ a thin knife-blade tapered at its operative end to form a single sharp cutting edge, and to provide the throat-plate with a needle-aperture and a knife-slit connected therewith to receive the operative edge of the knife-blade.
It has also been common to mount in fixed bearings in the bracket-arm the reciprocating bar carrying the knife, and to mount the throat-plate upon the cross slide-plate of the work-holder, so that the knife-slit was normally out of register with the knife-blade during the stitching operation, and assumed operative relation therewith only at the beginning and end of a cycle of operation of the machine. The small degree of lost-motion occasioned by the shifting of the throat-plate into and out of initial position was not seriously objectionable under such condition, for the reason that the wedge-shaped operative portion of the knife-blade served to properly center the knife within its receiving slit in the cutting operation.

According to the present invention, the thickness of the knife-blade is not reduced at its operative end to a thin cutting edge, but the blade is made in the form of a punch with a continuous cutting edge having portions spaced apart at opposite sides to inclose an intervening space, and it operates in conjunction with a die formed as a pe-
ripherally closed aperture in the throat-plate independent of the needle-aperture so as to afford a cutting edge coöperating with that of the knife or punch in the part adjacent the needle-aperture as well as in other parts. As the punch and die thus provided have closely fitted abrupt shoulders entirely lacking the guiding or centering means afforded by the taper knife-blade of the former construction, it has been found in practice necessary to maintain these cutting elements permanently in register with each other, and to this end the knife is mounted upon a reciprocating knife-bar journaled on bearings which are sustained in fixed relation with the throat-plate, thereby insuring the precision of action of the cutting elements and preventing their injury in performing the successive cutting operations. With the form of knife heretofore employed for this class of work, the knife-slit of the throat-plate was provided merely for clearness in the work-supporting member, and the end of the knife-edge adjacent the needle-aperture was as effective as the opposite end in cutting the material, when the knife was suitably sharpened, and the end of the slit could be disposed as close as desired to the end stitches of the buttonhole. With the punch of the present improvement, the throat-plate not only affords a support for the work, but provides a cutting element equally important with the punch in cutting the fabric, and it is therefore necessary that the knife-aperture should be closed peripherally or upon all sides, in order that the punching may be wholly severed from the body of the fabric and thrust downwardly through the throat-plate so as to produce a clean buttonhole. In practice, sufficient stock must be left between the adjacent portions of the knife- and needle-apertures to sustain the thrust of the punch, and hence the punch is so proportioned as to remove from the material a punching which is shorter than the distance between the opposite end stitches of the buttonhole. The portion of material inclosed within the buttonhole stitching is not, however, sufficiently large to materially impair the appearance of the finished article.

Figure 2:
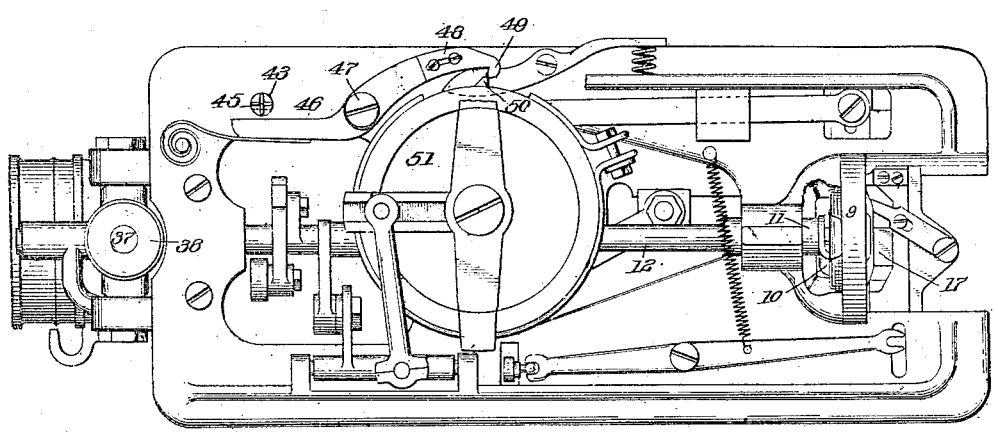
Figure 3:
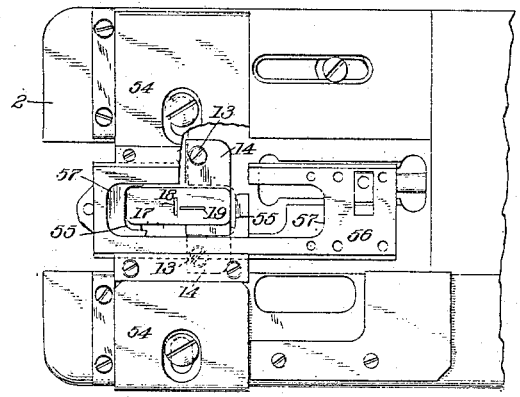

In the accompanying drawings, Figure 1 is a rear side elevation and Fig. 2 a bottom plan view of a Singer buttonhole machine embodying the present improvement. Fig.

1 upon which rests the frame constructed with the bed-plate 2 and bracket-arm including the hollow standard 3 and overhanging tubular member 4 terminating in the head 5. In practice, the bracket-arm head 5 has mounted therein a swinging frame in which is journaled the reciprocating needle-bar 6 carrying the laterally jogging needle 7 having coöperating therewith in the production of overseam stitches, the shuttle 8 which is mounted in the race 9 depending from the bed-plate and actuated by means of the rotary shuttle driving arm 10 whose hub 11 is fixed upon the rock-shaft 12 driven by suitable means.

Secured by means of screws 13 upon a suitable seat therefor provided in the upper face of the bed-plate 2 are the feet 14 having the screw-apertures 15 and provided at their adjacent ends with the standing ribs 16 sustaining the forwardly extending needle-plate 17 provided with the transverse needle-slot 18 and the longitudinally disposed knife-slot 19 arranged at one side of the center of the needle-plate and rearward of the needle-slot.

Suitably journaled within fixed bearings of the bracket-arm head 5 is the reciprocating knife-bar 20 carrying the block 21 having a rearwardly extending ear 22 apertured to embrace the guide-bar 23 and having secured to the depending portion 24 by means of the screw 25 the knife-blade 26 sustained permanently in register with the knife-slot 19 of the throat-plate. The knife-bar 20 is connected by means of the link 27 with the forward arm 28 of a rock-lever fulcrumed upon the stud-screw 29 carried by the bracket-arm 4 and having the rearwardly extending arm 30 connected by means of the link 31 with the forward arm 32 of a second rock-lever mounted upon the fulcrum-stud 33 sustained by the standard 3 and having the rearwardly extending arm 34 formed with the slot 35 embracing the stud 36 which is carried by the spring-pressed plunger 37 of the stop-motion mounted in the swinging lever 38 and adapted for engagement with the periphery 39 arm 48 with hooked extremity 49 adapted for engagement with the tripping stud 50 upon the periphery of the feed cam-wheel 51 for disengagement of the arm 46 with the rod 43 to enable the lever 38 to assume stopping position under the action of its spring 52. The engagement of the eccentric periphery 39 of the stopping cam with the end of the plunger-bar 37 causes the descent of the latter in opposition to its spring 53 and the consequent descent of the knife-bar 20 for a cutting operation, the parts being restored to initial position by the rise of the plunger-bar 37 to enter its stopping notch adjacent the shoulder 40 of the stopping cam.

Fitted in suitable guideways of the bed-plate is the cross slide-plate 54 which is formed with an elongated opening 55 of substantially the length of the needle-plate 17 but of a width materially greater than that of the needle-plate in order to permit of its transverse work-shifting movement relative to the stationary needle-plate. The slide-plate 54 is formed with suitable ways extending across the same in which are fitted the edges of the longitudinally moving slide-plate 56 formed with a central opening 57 exceeding the needle-plate 17 in length by a distance equivalent to the maximum travel of the slide-plate in feeding the work and having a width exceeding that of the needle-plate by the extent of side-shift movement of the work-holder in passing from one side-stitching position to the other. These slide-plates are provided with suitable connections with the feed-cam 51 from which they derive their respective operative movements.

Secured upon the slide-plate 56 is the bearing bracket 58 having mounted thereon by means of the pivotal pin 59 the rocking block 60 to which is secured the spring-pressed arm 61 provided with the clamping foot 62 adapted to clamp the work upon the needle-plate and in practice apertured to admit the needle and the cutting knife. In the machine, as represented in the patents before mentioned, the throat-plate was mounted upon the cross slide-plate, and the clamping foot drew the fabric lengthwise over the face of the throat-plate in performing its longitudinal feeding movements thereon; but in the present machine, as the throat-plate is stationary, the fabric is drawn over the face of the latter lengthwise of the buttonhole in the side-stitching operations and also crosswise thereof in the side-shift movements for the end stitching operations.

As will be seen by reference to the drawings, the lower extremity of the knife-blade 26 is not contracted to form a chisel-edge but terminates in a flat lower face 26' substantially at right angles to the side faces and at an inclination with the face of the needle-plate so as to form a cutting edge of substantially rectangular shape inclosing a space having a width equivalent to the full width of the knife-blade and a length proportional to that of the blade. The knife-slot 19 of the plate 17 is correspondingly formed, and is closed at both the sides and the ends, thereby providing a complemental cutting member affording a die to receive the punch which the blunt knife-blade constitutes.

Figure 4:
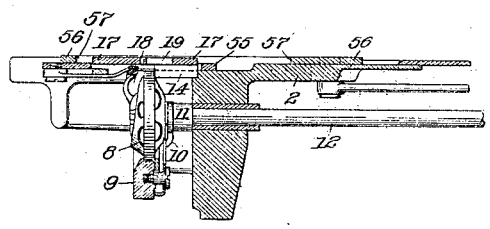
Figure 5:
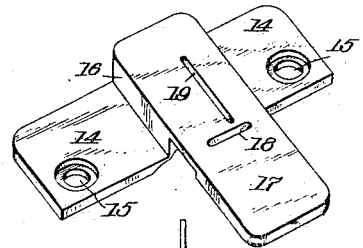
Figure 6:
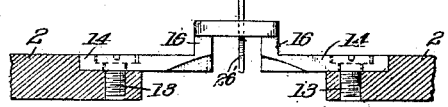

As indicated in Fig. 4, the needle-aperture 18 is disposed substantially above the forward edge of the shuttle-rim, while the knife-slot 19 is arranged mainly behind the shuttle-rim. When the stop-motion is tripped, the parts occupy positions substantially as represented in Figs. 1 and 2, the shuttle driving arm 10 occupying a position at the right of the operator facing the end of the machine, but just as the knife 26 passes through the throat-plate the instant before the machine comes to rest, the shuttle driving arm 10 assumes a position at the opposite side of the shaft, thereby leaving a clear space beneath the slot 19. It will therefore be seen that the cuttings will not only be wholly removed from the fabric at the completion of a stitching operation, but will be ejected through the throat-plate at a time when a clear space is left to enable them to pass down into the machine base without being deflected into the shuttle-race so as to clog the same in subsequent stitching operations. While this is a desirable feature of the present improvement, it is evidently not essential to the effective disposition of the cuttings.

In the machine represented in the drawings, the cutting action is designed to take place at the completion of the final barring operation and while the stitch-forming mechanism is producing the last of a few fastening stitches. The cutting therefore takes place after the second step of the side-shift of the work to bring the work-holder in initial side-stitching position, and the knife-slot 19 is therefore disposed at one side of the center of the throat-plate to insure the proper register of the cutting elements with the space intermediate the parallel lines of side stitching.

Having thus set forth the nature of the invention, what I claim herein is:—

1. In a buttonhole sewing machine, in combination, a support, a reciprocating cutter-carrier mounted in bearings fixed relatively to said support, a punch mounted in said carrier and formed with a continuous cutting edge with opposite portions inclosing an intervening space, stitch-forming mechanism comprising a reciprocating needle, a throat-plate fixed upon said support, one portion thereof being provided with a needle-aperture and an adjacent integral portion thereof being provided with an aperture peripherally closed to afford a cutting die in permanent register with said punch and wholly independent of the needle-aperture, a work-holder formed with an aperture to receive said throat-plate, actuating means for the stitch-forming mechanism and said punch, and means for producing relative traveling movements between the work-holder and the stitch-forming mechanism.

2. In a buttonhole sewing machine, in combination, a frame constructed with a bed-plate and an overhanging bracket-arm, a reciprocating cutter-carrier journaled in fixed bearings of the bracket-arm, a punch mounted in said carrier and formed with a continuous cutting edge with opposite portions inclosing an intervening space, stitch-forming mechanism comprising a reciprocating and laterally jogging needle mounted in said bracket-arm, a stationary throat-plate secured upon said bed-plate and provided with an elongated needle-aperture and with an adjacent independent and peripherally closed aperture to afford a cutting die for coöperation with said punch, a laterally and longitudinally movable work-holder having a lower member apertured to embrace said throat-plate, independent actuating means for the stitch-forming mechanism and said cutter-carrier, and means for producing longitudinal feeding movements and side-shift movements of said work-holder relatively to said throat-plate.

3. In a buttonhole sewing machine, in combination, a support, a reciprocating cutter-carrier mounted in bearings fixed relatively to said support, a punch mounted in said carrier, stitch-forming mechanism comprising a reciprocating needle, a throat-plate fixed upon said support and provided with a needle aperture and with an adjacent aperture peripherally closed to afford a cutting die, a work-holder having a member formed with an aperture to receive said throat-plate and to permit lateral and longitudinal movements of said member, whose work-supporting surface is maintained in substantially the work-supporting surface plane of said throat-plate, actuating means for the stitch-forming mechanism and said punch, and means for producing relative traveling movements between the workholder and the stitch-forming mechanism.

In testimony whereof, I have signed my name to this specification, in the presence of two subscribing witnesses.

EDWARD B. ALLEN.

Witnesses:
E. L. TOLLES,
H. J. MILLER.